Jan. 26, 1954 W. A. HUNTER 2,666,957
MACHINE FOR THE INTENSIVE OPENING OF FIBROUS MATERIALS
Filed April 4, 1951 2 Sheets-Sheet 1
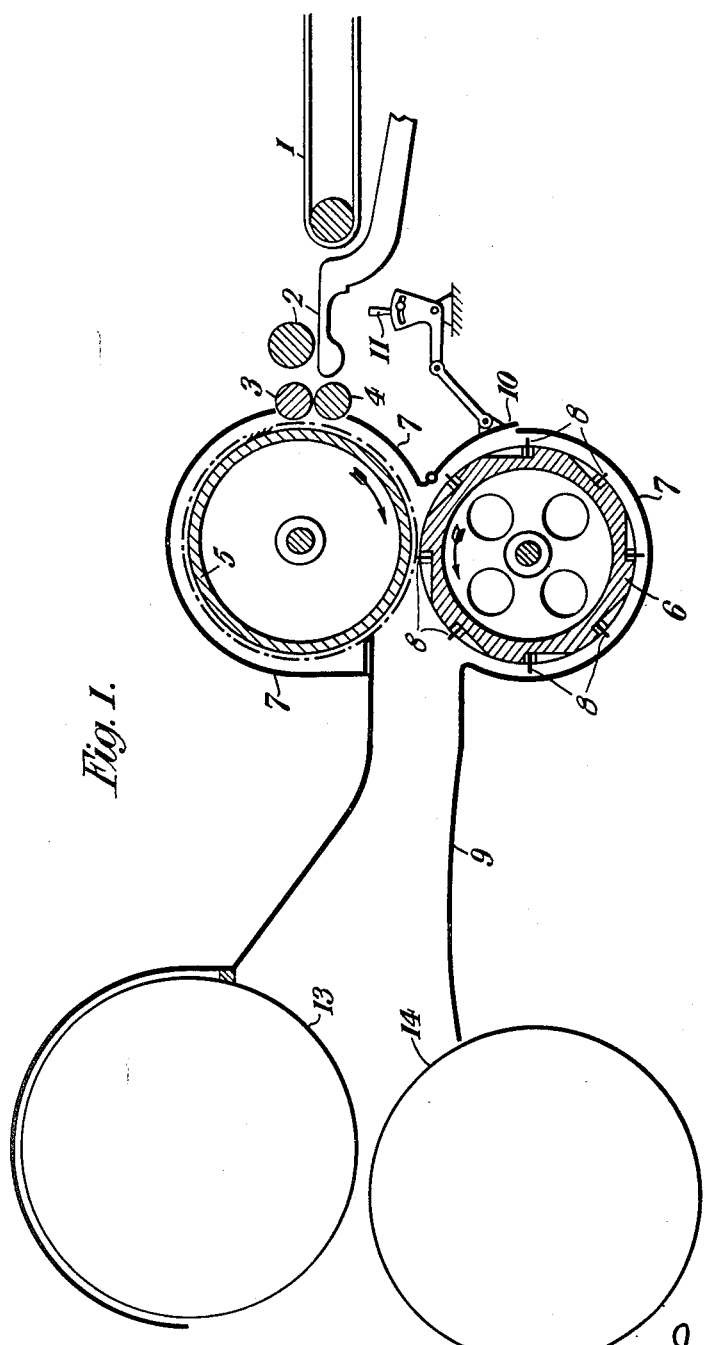

Jan. 26, 1954 W. A. HUNTER 2,666,957
MACHINE FOR THE INTENSIVE OPENING OF FIBROUS MATERIALS
Filed April 4, 1951 2 Sheets-Sheet 2
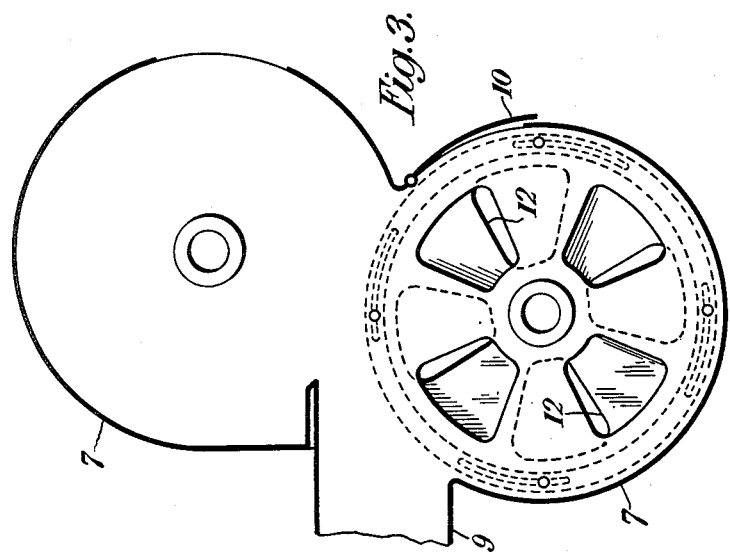
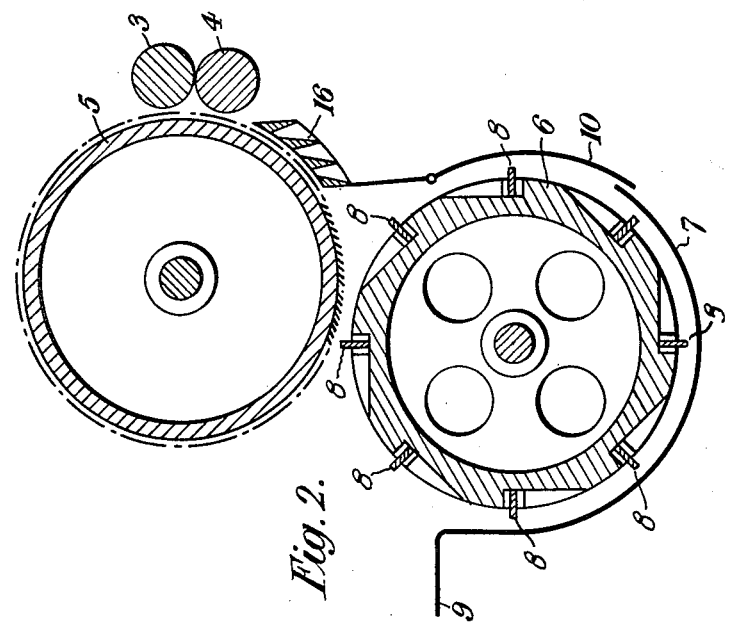

UNITED STATES PATENT OFFICE 2,666,957

MACHINE FOR THE INTENSIVE OPENING OF FIBROUS MATERIALS

William Aldred Hunter, Helmshore, Rossendale, England, assignor to T. M. M. (Research) Limited, Helmshore, Rossendale, England Application April 4, 1951, Serial No. 219,196

3 Claims. (Cl. 19—88)

This invention relates to machines for opening fibrous materials of the type comprising a taker-in type of beater covered with saw teeth, to which a more or less uniform sheet of fibres is fed by a suitable feed mechanism, the beater having a combing action on the sheet of fibers and effecting a high degree of fibre dispersion.

Such machines have been used for opening baled rayon staple fibre, cotton and other fibres, but they have, in their present form, the disadvantage that damage is caused to the material due to its being taken several times round the beater on the saw teeth points before being stripped off, with the result that "nep" or rolled fibres are formed and fibres are broken.

This invention has for its object to remove this defect by ensuring that all the fibres are removed from the beater in something less than one revolution of the beater.

The invention accordingly provides a machine of the above-stated type comprising a stripping beater which is disposed close to the beater and coacts therewith to exert a stripping effect on the fibres on the beater at a location following that at which fibres are fed to the beater by the feeding device, said stripping beater being driven at a higher peripheral speed than the toothed beater and having thereon a series of radially extending flexible flaps which have a fanning effect on the beater teeth.

Preferably the stripping beater is so disposed in relation to a surrounding casing as to act as a fan and induce a flow of air to enter the casing and to assist the flaps to strip the material from the toothed beater, the air being discharged into the passage leading to condenser cages or other devices for collecting the material produced by operation of the machine.

When processing cotton or other fibrous materials from which it may be necessary to extract trash or other unwanted foreign matter, a suitable grid bar system can be applied to one or both beaters.

The manner in which the invention may be carried into effect is hereinafter more fully described with reference to the accompanying diagrammatic drawings. In said drawings, Fig. 1 is a longitudinal section of an opener incorporating the improvements provided by this invention. Fig. 2 is a fragmentary section of a modified machine, and Fig. 3 is an end elevation of the casing enclosing the beater and stripper assembly.

It will be seen that the opener illustrated in Fig. 1 resembles in general constructional arrangement the conventional opener or scutchers, incorporating a feed device comprising the travelling lattice 1, by which the fibres are fed to the roller and pedal motion 2 and thence to the intake rollers 3, 4. The sheet of fibres passing through the rollers 3, 4 is immediately subjected to the combing action of the rotary saw-toothed taker-in beater 5 mounted on a horizontal axis extending normally to the path of feed of the fibres. The combed fibres are carried downwardly by the teeth of the taker-in beater 5 and, after traversing slightly more than 90° of arc they meet the stripping beater 6.

The stripping beater 6 consists of a roller mounted parallel to the beater 5 and enclosed within the same casing 7, having in its periphery a series of flexible flaps 8 extending lengthwise of the roller. Said flaps 8 may be made of strips of leather, india rubber sheet or other suitable matter which, when fastened along one edge, will operate on the fibres with a fanning effect. Flaps of the materials referred to will be sufficiently resilient to avoid damage to the teeth of beater 5 if, contrary to intention, they are set close enough to the beater to brush contact the teeth thereof. The stripping beater 6 rotates faster than the beater 5 and in the opposite rotary direction, its flaps 8 acting to strip groups of fibres from the teeth of the beater 5 and to impel them positively along the trunk 9 which leads away from the casing 7.

The casing 7 is preferably provided with an adjustable air inlet 10, capable of being regulated by means of the lever 11. In addition, the casing 7 is furnished opposite the ends of the stripping beater 6 with adjustable air inlets 12 (Fig. 3), admitting air to the hollow interior of the beater 6, so that the radial discharge of air between the strips or flaps of the latter may assist in the action of stripping the teeth of the beater 5.

The fibres delivered by the stripping beater 6 are carried along the trunk 9 by the air current in conventional fashion to the rotary condenser cages 13, 14 and delivered thence to a lap-forming machine.

When the cotton or other fibrous materials under treatment are dirt-laden, the extraction of the unwanted foreign matter and trash may be assisted by the use of a system of mote-knives or grid bars such as that shown at 16 in Fig. 2, in association with one or both of the members 5 and 6. Otherwise the structure of Fig. 2 is the same as that of Fig. 1.

What I claim as my invention and desire to secure by Letters Patent is:

1. A textile opener comprising, in combination, a rotary, toothed taken-in beater, a stripping beater rotating at a higher peripheral speed than, and in the opposite direction to the taker-in beater, the stripping beater carrying on its periphery a series of flexible flaps which extend radially therefrom substantially, but not quite, into contact with the teeth of the taker-in beater, and operate solely through a fanning effect to remove all the fibers in a forward direction from forward edges of the teeth of the taker-in beater, and a casing surrounding the beaters and defining a trunk for conducting the fibers directly away from the beaters in a direction substantially at right angles to the line of centers of the beaters, and having an air guide portion surrounding the stripping beater in proximity thereto which guide portion extends well into the space between the beaters at the side opposite said trunk, for directing substantially all the air delivered by the stripping beater through a confined space between the beaters substantially at right angles to said line of centers and in the direction in which the fibers are carried forward by the taker-in beater.

2. A textile opener as claimed in claim 1, wherein, the casing has an adjustable inlet admitting air to assist the stripping of the fibres from the taker-in beater teeth and the conveyance of the fibers away therefrom.

3. A textile opener as claimed in claim 1, wherein, said casing has at its ends adjustable inlets through which air is admitted to the hollow interior of the stripping beater, to assist the stripping of the fibres from the taker-in beater.

WILLIAM ALDRED HUNTER.

References Cited in the file of this patent

UNITED STATES PATENTS

| Number | Name | Date |
|---|---|---|
| 425,715 | Tindell et al. | Apr. 15, 1890 |
| 1,030,249 | White | June 18, 1912 |
| 1,175,664 | Shute | Mar. 14, 1916 |
| 2,064,602 | Harris | Dec. 15, 1936 |
| 2,300,978 | Sheppard | Nov. 3, 1942 |